(12) United States Patent
Hagen

(10) Patent No.: US 11,867,822 B2
(45) Date of Patent: Jan. 9, 2024

(54) ANTENNA ASSEMBLY AND ANTENNA SYSTEM

(71) Applicant: Kongsberg Seatex AS, Trondheim (NO)

(72) Inventor: David Møller Hagen, Trondheim (NO)

(73) Assignee: Kongsberg Discovery AS, Horten (NO)

( * ) Notice: Subject to any disclaimer, the term of this patent is extended or adjusted under 35 U.S.C. 154(b) by 304 days.

(21) Appl. No.: 17/414,102

(22) PCT Filed: Oct. 24, 2019

(86) PCT No.: PCT/NO2019/050231
§ 371 (c)(1),
(2) Date: Jun. 15, 2021

(87) PCT Pub. No.: WO2020/130839
PCT Pub. Date: Jun. 25, 2020

(65) Prior Publication Data
US 2022/0050214 A1    Feb. 17, 2022

(30) Foreign Application Priority Data

Dec. 19, 2018  (NO) .................................. 20181648

(51) Int. Cl.
| | |
|---|---|
| *H01Q 21/00* | (2006.01) |
| *G01S 19/30* | (2010.01) |
| *G01S 19/21* | (2010.01) |
| *G01S 19/29* | (2010.01) |
| *H01Q 1/52* | (2006.01) |

(52) U.S. Cl.
CPC .............. *G01S 19/30* (2013.01); *G01S 19/21* (2013.01); *G01S 19/29* (2013.01); *H01Q 1/523* (2013.01); *H01Q 21/00* (2013.01)

(58) Field of Classification Search
CPC .......... G01S 19/30; G01S 19/21; G01S 19/29; G01S 3/00; H01Q 1/523; H01Q 21/00; H01Q 1/42; H01Q 9/18; H01Q 9/32; H01Q 3/28; H01Q 3/30; H01Q 5/40; H01Q 19/18; H01Q 21/20; H01Q 1/34
See application file for complete search history.

(56) References Cited

U.S. PATENT DOCUMENTS

| | | | |
|---|---|---|---|
| 4,143,377 A | | 3/1979 | Salvat et al. |
| 6,094,175 A | * | 7/2000 | Alessi ...................... H01Q 1/42 |
| | | | 343/786 |
| 2009/0237314 A1 | * | 9/2009 | Lalezari ................. H01Q 21/10 |
| | | | 343/773 |
| 2012/0176286 A1 | | 7/2012 | Amert et al. |
| 2012/0188137 A1 | * | 7/2012 | Lalezari ................. H01Q 21/10 |
| | | | 343/773 |

(Continued)

FOREIGN PATENT DOCUMENTS

DE        10012789 C1     5/2001

OTHER PUBLICATIONS

International Search Report and Written Opinion dated Jan. 14, 2020 for International Patent Application No. PCT/NO2019/050231.

*Primary Examiner* — Kenneth T Lam
(74) *Attorney, Agent, or Firm* — Alix, Yale & Ristas, LLP

(57) ABSTRACT

Antenna assembly comprising the combination of a steerable phased array antenna with omnidirectional sector and a GNSS antenna, and antenna system comprising the antenna assembly.

19 Claims, 3 Drawing Sheets

(56) References Cited

U.S. PATENT DOCUMENTS

| | | | |
|---|---|---|---|
| 2015/0145741 A1* | 5/2015 | Moulder | H01Q 1/525 |
| | | | 343/773 |
| 2015/0280317 A1 | 10/2015 | Morin et al. | |
| 2018/0239028 A1 | 8/2018 | Ibendorf et al. | |
| 2019/0006770 A1* | 1/2019 | Mizzoni | H01Q 21/0037 |
| 2019/0237858 A1* | 8/2019 | Palmer | H01Q 9/28 |
| 2020/0052409 A1 | 2/2020 | Scannell | |

\* cited by examiner

ANTENNA ASSEMBLY AND ANTENNA SYSTEM

BACKGROUND

The disclosed embodiments are related to an antenna assembly, and to an antenna system.

The disclosed embodiments are especially related to an antenna assembly and antenna system comprising the combination of a steerable phased array antenna with omnidirectional sector and a GNSS antenna.

Existing communications solutions for mobile behavior, e.g. a vessel or other moving craft, are generally omnidirectional, sending the signal in all directions. Other communication solutions use directive antenna solutions with either sector fixed or high gain steerable, e.g. parabolic antennas, which gives a powerful narrow beam towards the receiver by using mechanically antenna techniques.

Steerable phased array antennas can be assembled as a hybrid communication solution by having a high gain steerable beam in an omnidirectional operational sector. For using phased array antennas in a maritime environment, the operational area must be omnidirectional in order to maintain a stable link as the heading of a vessel changes according to operation, and vessel movements from the sea. A real-time steerable phased array can, with an omnidirectional sector, steer the maximum direction of the transmission in the direction of the receiver and use the strongest link path to the receiver.

From US 2018239028 A1 is known an assembly for determining position using GNSS with an antenna assembly comprising a plurality of antennas and an evaluation assembly which is arranged downstream where said evaluation assembly is being supplied with the antenna-received signals and containing both the GNSS receivers that are attached to the antennas and an evaluation device which is connected downstream the GNSS receiver. In order to increase the accuracy and reliability when determining position, some redundant GNSS receivers are connected in parallel with the GNSS receivers, and comparators are connected downstream, where said comparators stop the generation of the respective main direction vector signals if there are differences between an output signal of the first GNSS receiver and a further output signal of a redundant GNSS receiver.

Omnidirectional antennas require higher power to maintain a communication link over distance as the signal is transmitted in all directions. This gives the system limited range compared to directive systems. An omnidirectional antenna system has no possibilities to compensate for changes in the link path environment between the sender and receiver for compensating for dynamical behavior of the vessel or craft.

From US 2015280317 A1 is known a system and a device arranged with bi-conical antenna having a top cone assembly and a bottom cone assembly, where the parts of the top antenna assembly are similar to the parts of the bottom antenna assembly. The assembly has a middle cone and a topmost cone. The middle cone and the topmost cone are connected at the rim of the middle cone. The rim can also be seen as a chine or a ridge or sharp intersection between a side and a bottom. The middle cone is a cone with its apex terminating at a dielectric spacer. The cone section's height should be equal to the height of the middle cone, thereby locating the chine halfway between the cone's apex and the dielectric spacer and the top rim of the topmost cone. In addition, the diameter of the topmost cone's top rim is equal to the total height of the antenna. In transmit mode, the electromagnetic wave travels from the coaxial cable, through the feed section (dielectric spacer), to the antenna assemblies, and radiates out. The feed has to match the wave impedances between the coaxial cable and the antenna assemblies region. Because of the presence of the dielectric spacer, the matching may prove difficult. If the feed design is poor, there will be interactions between the feed and the transition between the truncated cone section and the cone section and the rims of the antenna assemblies. These interactions will create a gain drop that degrades the antenna performance.

As high gain antennas provide high link margin, the large mechanically antennas suffer from vessel movements from the sea and when the vessel is sailing, or similarly when a craft moves onshore, which causes misalignment of the antennas. The mechanical steering mechanisms requires maintenance in order to operate properly over time.

There is accordingly a need for an antenna assembly and antenna system controllable without moving parts.

It is further a need for an antenna assembly and antenna system capable of compensating for movements of a movable object the antenna system is arranged on.

SUMMARY

Provided herein is an antenna assembly and antenna system partly or entirely solving the above-mentioned disadvantages or lacks of prior art.

Provided herein is an antenna assembly with a steerable phased array antenna with omnidirectional sector and GNSS antenna without any movable parts.

Also provided herein is an antenna assembly and antenna system without the need for communication with external units for calibration and/or timing.

Also provided herein is an antenna assembly and antenna system with improved timing control in relation to prior art systems.

Also provided herein is an antenna assembly and antenna system with an omnidirectional steerable phased array antenna enabling radio communication and further comprising a GNSS antenna enabling frequency calibration and improved timing resolution.

Also provided herein is an antenna assembly with a steerable phased array antenna with omnidirectional sector that can be controlled in real-time.

Also provided herein is an antenna assembly and antenna system enabling both radio communication and positioning.

Also provided herein is an antenna assembly and antenna system providing maximum gain for the GNSS antenna in zenith direction.

Also provided herein is an antenna assembly and antenna system providing high gain towards receiver for maintaining positive link margin over range, and steer antenna direction to compensate a movable object dynamical behavior.

Also provided herein is an antenna assembly and antenna system that, based on knowledge of direction of a receiver and which signal level is required for decoding signal, always will be focused on the receiver.

An antenna assembly according to the disclosure comprises a steerable phased array antenna with omnidirectional sector and a GNSS antenna.

The antenna system makes use of the mentioned antenna assembly.

The steerable phased array antenna with omnidirectional sector is formed by a truncated cone-shaped bottom reflector and a truncated cone-shaped top reflector spaced apart in vertical direction. Accordingly, the top and bottom reflectors are separate from each other in vertical direction by a spacing such that it is only air between the mentioned reflectors. The mentioned reflectors are arranged in a superposition facing each other with the pointing end, wherein an antenna array is arranged in the spacing between the said truncated cone-shaped bottom and top reflector.

The antenna array is formed by at least three antenna elements arranged protruding from the pointing end of the truncated cone-shaped bottom reflector into the mentioned spacing. The at least three antenna elements are formed by monopole antennas or dipole antennas.

The truncated cone-shaped bottom reflector is further provided with a centrally arranged hole at the pointing end for receiving and accommodating the GNSS antenna.

The truncated cone-shaped bottom and top reflector are reflective for the signals of the steerable phased array antenna with omnidirectional sector, and the truncated cone-shaped top reflector is further transparent for GNSS signals for the GNSS antenna.

The shape of the truncated cone-shaped bottom and top reflector forms gain and maximizes the radiation pattern for the steerable phased array antenna with omnidirectional sector in a 360 degree sector in the horizontal plane of the antenna array.

The antenna array of the steerable phased array antenna with omnidirectional sector is operated under phased array principle with control of phase and amplitude of each individual antenna element. By this is achieved beam steering in a 360 degree sector, which is suitable for e.g. maritime communication or for crafts moving in general. The elevation beam width is fixed and the gain is controllable only on azimuth direction, correspondingly the fixed elevation beam width is chosen mechanically.

The angle of the truncated cone-shaped bottom and top reflector is adjusted in conjunction with the length of sloping plane of the truncated cone-shaped bottom and top reflector and the operating frequency to setting lobe elevation beam width.

Accordingly, the form of the truncated cone-shaped bottom and top reflector can consequently be adjusted for the frequency and operational requirements with respect to elevation beam width and desired gain in horizontal plane for the steerable phased array antenna with omnidirectional sector.

As mentioned above, the truncated cone-shaped top reflector, is arranged at a distance above the truncated cone-shaped bottom reflector and thus a distance from the GNSS antenna to be transparent and give maximum gain in the zenith direction.

The antenna system according to the disclosure makes use of the mentioned antenna assembly and is further comprising an antenna processing module, GNSS receiver module, a radio module and a time reference module.

The antenna processing module according to the disclosure will be arranged for controlling the steerable phased array antenna by controlling phase and amplitude of the individual antenna elements. The antenna processing module will further be arranged for controlling operational frequency of the steerable phased array antenna by being provided with oscillators.

The radio module is arranged for controlling the radio communication to and from the antenna system in communication with an external unit for input or output of communication data/information.

The function of the GNSS receiver module and time reference module for the antenna system is timing and positioning. In the disclosed embodiments, the timing is used for calibration of oscillators controlling the operational frequency of the omnidirectional steerable phased array antenna, and time synchronization of the radio communication module. In communication systems, time synchronization is important for maintaining track of transmission time slots.

Positioning can be used for adapting frequencies and power levels of the antenna system, which may be dependent on the geographical position (different jurisdiction).

The disclosed embodiments accordingly provide an antenna system with a steerable phased array antenna with omnidirectional sector that can be controlled in real-time.

Also provided is an antenna assembly and antenna system providing high gain towards a receiver for maintaining positive link margin over range, and ability to steer antenna direction to compensate a movable object dynamical behavior.

The antenna system makes use of knowledge about direction of the receiver and which signal level the receiver needs to be able to decode the signal. The information is received as a part of the communication protocol between units to communicate.

Accordingly, the effect of the antenna assembly/system can be controlled to not be higher than required, and will always be focused on the receiver.

The antenna system will be controlled by known methods for beam/lobe steering in phased array systems, which is considered to be common knowledge for a skilled person and is not further described in detail herein.

The above-described components will be arranged in a sealed housing (one sealed unit) adapted for arrangement/fixation to a movable object, such as an offshore or onshore craft.

A major advantage of the disclosed embodiments is that the antenna assembly and antenna system are fixed and contain no movable parts arranged in the same compact unit. This makes antenna mounting extremely easy and reduce antenna maintenance to a minimum, as well as no strict requirements for installation and mechanical setting.

There are no requirements for calibration.

There is further no need for input about direction, as the receiver will find this itself. The radio protocol scans for units in an initial contact mode, whereupon the replied signal from the receivers is used to decompose range and bearing of the signal.

BRIEF DESCRIPTION OF THE DRAWINGS

The present invention will below be described in further detail with reference to the attached drawings, where.

DETAILED DESCRIPTION

Figure 1:
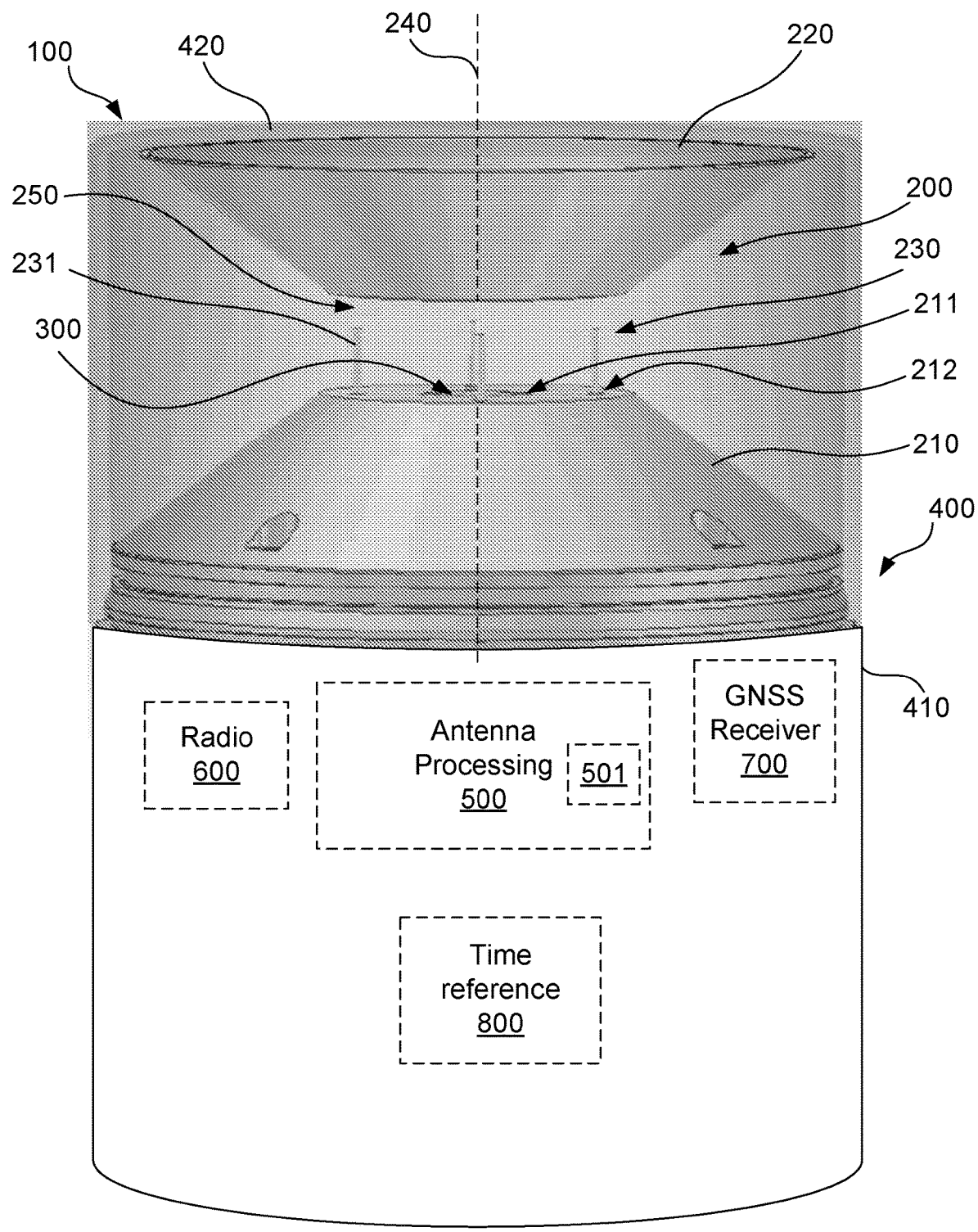
FIG. 1 is a principle drawing of an embodiment of an antenna assembly and antenna system according to the disclosure.

Reference is now made to FIG. 1 which is a principle drawing of an antenna assembly 100 according to the disclosure. The antenna assembly 100 comprises a steerable phased array antenna 200 with omnidirectional sector and a GNSS antenna 300, arranged in a housing 400.

The steerable phased array antenna 200 with omnidirectional sector is formed by a truncated cone-shaped bottom reflector 210 and a truncated cone-shaped top reflector 220 and an antenna array 230.

The truncated cone-shaped bottom reflector 210 and truncated cone-shaped top reflector 220 are arranged in a superposition facing each other with pointing end thereof. The truncated cone-shaped bottom reflector 210 and truncated cone-shaped top reflector 220 are arranged spaced apart in vertical direction with a common vertical center axis 240, providing a spacing 250 therebetween. The antenna array 230 is arranged in the mentioned spacing 250.

The truncated cone-shaped bottom 210 and top reflector 220 are reflective for signals of the steerable phased array antenna 200 with omnidirectional sector, and the truncated cone-shaped top reflector 220 is further transparent for GNSS signals for the GNSS antenna 300. The truncated cone-shaped bottom 210 and top 220 reflector are reflective for signals of e.g. broadband radio signals in the order of 5 GFIz, while the truncated cone-shaped top reflector 220 will be transparent for GNSS signals, which typically will be in the order of 1-2 GFIz, which signals will not interfere with each other.

The antenna array 230 is formed by at least three antenna elements 231, and even more preferably at least four antenna elements 231. The antenna elements 231 may be monopole antennas, as shown in the example embodiments, or dipole antennas. The antenna elements 231 will be distributed along the circumference of the frustum of the truncated cone-shaped bottom reflector 210 with an extension in the vertical plane towards the truncated cone-shaped top reflector 220, but not in contact with the truncated cone-shaped top reflector 220.

The truncated cone-shaped bottom reflector 210 is further provided with a centrally through hole 211 adapted for receiving and accommodating the GNSS antenna 300.

The truncated coned-shaped bottom reflector 210 is further provided with through holes 212 at the frustum thereof, i.e. the pointing end, adapted for receiving and accommodating the antenna elements 231.

The through holes 212 for the antenna elements 231 preferably exhibit a larger diameter than the antenna elements 231 such that there is no physical or electrical contact between the antenna elements 231 and the truncated cone-shaped bottom reflector 210.

The housing 400 is formed by a main body 410 and top cover 420. The main body 410 is adapted for arrangement/fixation of the antenna assembly 100 to an object, such as an offshore or onshore craft, as well as accommodating components for powering and controlling the antenna assembly 100, as will be further described below. The cover 410 is adapted for accommodation of the steerable phased array antenna 200.

The top cover 420 is exhibiting a mainly cylinder shape and is closed at upper end and open at the lower end, wherein the lower end of the top cover 420 and the upper part of the main body 410 are provided with corresponding attachment means, such as threads, for detachable attachment of the top cover 420 to the main body 410. The top cover 420 is formed by a material transparent for both GNSS signals and phased array antenna signals. There is preferably arranged sealing means (not shown), such as an O-ring, between the main body 410 and the top cover 420 ensuring a sealed environment for the components of the antenna assembly 100/antenna system.

The truncated cone-shaped bottom reflector 210 is fixed to the upper end of the main body 410 by corresponding attachment means (not shown), while the truncated cone-shaped top reflector 220 is fixed to the closed end of the top cover 420 by attachment means (not shown), at interior side thereof.

Accordingly, when the top cover 420 is arranged to the main body 410, the truncated cone-shaped top reflector 220 will be positioned above the truncated cone-shaped bottom reflector 210 with a desired distance therebetween, which distance is at least longer than the extension of the antenna elements 231 to ensure that the truncated cone-shaped top reflector 220 is not in physical or electrical contact with the antenna elements 231. The distance may e.g. be twice the length of the monopole antennas 231 such that both the truncated cone-shaped bottom reflector 210 and truncated cone-shaped top reflector 220 are positioned with the same distance from the upper (transmitting) end of the antenna elements 231. Depending on the desired properties of the steerable phased array antenna 200, the distance of the truncated cone-shaped bottom reflector 210 and truncated cone-shaped top reflector 220 from the upper end of the monopole antennas 231 may be different.

Accordingly, the truncated cone-shaped top reflector 220 will be "floating" above the truncated cone-shaped bottom reflector 210 and there is no physical or electrical connection between the truncated cone-shaped bottom reflector 210 and truncated cone-shaped top reflector 220.

The shape of the truncated cone-shaped bottom reflector 210 and truncated cone-shaped top reflector 220 may be similar or different, and together form gain of the steerable phased array antenna 200 with omnidirectional sector and maximizes radiation pattern of the steerable phased array antenna 200 with omnidirectional sector in a 360 degree sector in horizontal plane of the steerable phased array antenna 200.

Further, the lobe elevation beam width of the steerable phased array antenna 200 with omnidirectional is given by length and inclination (angle in relation to the vertical plane) of sloping plane of the truncated cone-shaped bottom reflector 210 and truncated cone-shaped top reflector 220, and operating frequency, which will further described below.

In general, it will be such that the inclination of the sloping plane of the truncated cone-shaped bottom reflector 210 and truncated cone-shaped top reflector 220 will provide a narrower beam the smaller the angle is in relation to the vertical plane, and a wider beam the larger the angle is in relation to the vertical plane.

Figure 2:
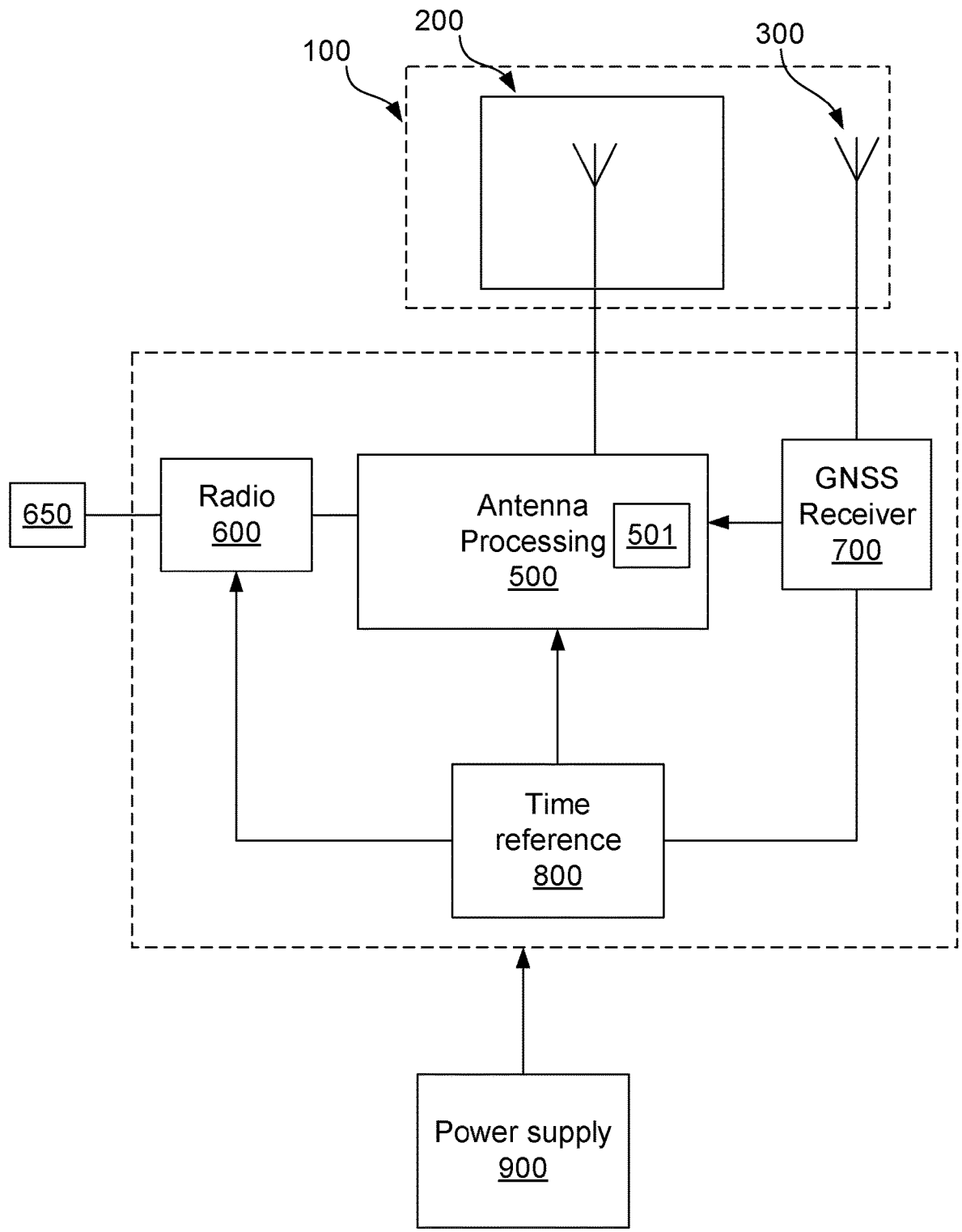
FIG. 2 is a block diagram of the antenna system according to the disclosure.

Reference is now made to FIG. 2 showing a block diagram of an antenna system. The antenna system in addition to the above described antenna assembly 100 comprises an antenna processing module 500 provided with means and/or software for controlling the antenna array 230 of the steerable phased array antenna 200, The antenna processing module 500 is arranged for controlling of the antenna array 230, i.e. the individual antenna elements 231, by controlling phase and amplitude of the individual antenna elements 231. The antenna processing module 500 further comprises oscillators 501 controlling the operational frequency of the steerable phased array antenna 200 with omnidirectional sector.

The antenna system further comprises a radio module 600 for controlling the radio communication to and from the antenna system in communication with an external unit 650 for input or output of communication data/information. Input data will typically be knowledge about direction of the receiver and which signal level the receiver needs to be able to decode the signal, which information will be a part of the communication protocol between two antenna systems to communicate as mentioned above.

The antenna system further comprises a GNSS receiver module 700 connected to the GNSS antenna 300, typically in the form of a printed circuit board.

The antenna system will typically further comprise a time reference module 800 for extracting a time reference from the received GNSS signal that will be supplied to the antenna processing module 500 and the radio communication module 600, The antenna processing module 500 uses the time reference for calibration of the oscillators 501 controlling the operational frequency, and time synchronization. The antenna system may make use of TDMA, either as a single frequency channel half-duplex system, or as a full-duplex system with separate channels for TX and RX.

The radio module 600 will make use of the time reference for maintaining track of transmission time slots.

The antenna processing module 500 can be implemented as a printed circuit board.

According to one disclosed embodiment the mentioned antenna elements 231 of the antenna array 230 and GNSS antenna 300 are arranged to a common platform/printed circuit board, i.e. the lower end of the antenna elements 231 are arranged to the common platform/printed circuit board.

Accordingly, the common platform/printed circuit board with the GNSS antenna 300 and antenna elements 231, during assembly, is moved from lower side of the truncated cone-shaped bottom reflector 210 such that the antenna elements 231 are received and positioned via the through holes 212 as well as positioning the GNSS antenna 300 in the centrally through hole 211, wherein the common platform/printed circuit board is fixed in accurate position in relation to the truncated cone-shaped bottom reflector 210 by corresponding fastening means (not shown), such as screws and threaded holes. By this is achieved as short as possible transmission line between the antenna elements 231 and the truncated cone-shaped bottom 210 and top 220 reflector, due to the free end (transmitting end) of the antenna elements 231 are positioned in the spacing 250 between the truncated cone-shaped bottom reflector 210 and the truncated cone-shaped top reflector 220.

There will preferably be arranged insulating means, such as one or more gaskets (not shown), between the truncated cone-shaped bottom reflector 210 and common platform/printed circuit board for sealing therebetween as well as ensuring that the there is no electrical contact with the truncated cone-shaped bottom reflector 210.

In the described embodiment the GNSS antenna 300 and steerable phased array antenna 200 with omnidirectional sector will thus have the same ground-plane. This is not a requirement, but will be practical for reducing the size of the components and providing a compact unit. The steerable phased array antenna 200 with omnidirectional sector may alternatively be provided with a separate printed circuit board if desired.

The antenna system is powered by a power supply 900 and the antenna processing module 500 may be arranged for controlling the power to the steerable phased array antenna 200 and optionally the GNSS antenna 300.

Figure 3:
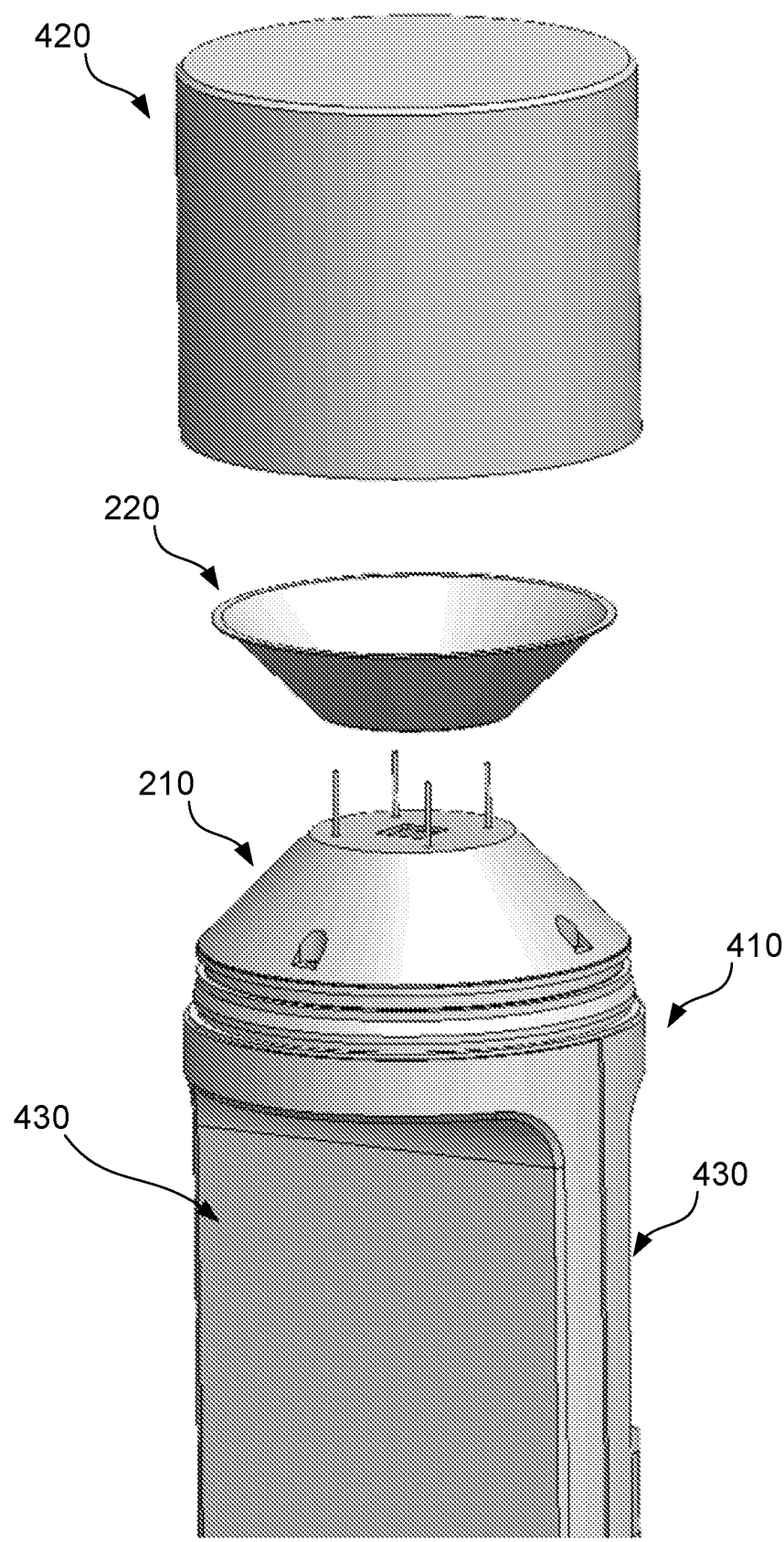
FIG. 3 is a principle drawing of an alternative embodiment of a housing for the antenna assembly and antenna system.

Reference is now made to FIG. 3 showing an alternative embodiment of the main body 410. The main body 410 and the components of the antenna system arranged therein, i.e. all components below the truncated cone-shaped bottom reflector 210 is in metal, which will affect the antenna performance, and hence may need to be compensated for. When the main body 410 and the components are of metal or containing metal, these will act as an extension of the truncated cone-shaped bottom reflector 210 and will thus have to be considered when designing the antenna system. By providing the main body 410 with corrugated sides (not shown), this will balance the mass of the main body 410, and contributing to an improved horizontal radiation pattern (with fixed elevation).

In the shown embodiment the main body 410 is further provided with slotted/recessed longitudinal sides 430 reducing the size and weight thereof.

An advantage with the disclosed embodiments is that there is a short transmission line to the antenna elements 231 that results in low losses.

A controllable antenna system where one may adapt transmission direction and power to a known receiver is provided.

When using steerable phased array antenna providing parabolic radiation pattern this requires attitude compensation when the antenna system is arranged on a movable object. With the steerable phased array antenna system according to the disclosure, it is possible to have high gain towards the receiver for maintaining positive link margin over range, and steer the antenna direction to compensate for the object, such as a vessel or craft, dynamically behavior. The controlling is performed independently of motion of the object, as only the radio signals are used, resulting in continuous and rapid controlling.

The antenna system disclosed herein may further be arranged for using the position data provided by the GNSS antenna 300. Frequencies and power levels may be dependent on the geographical position (different jurisdiction). Manual procedures to change the frequency and power levels is time consuming and cumbersome and may lead to human errors when changing the required parameters. In order to solve this problem, information about geographical areas and limitations regarding spectrum and power levels may be stored in a database which can be used for selecting the appropriate parameters for the actual geographical area by the use of position data. In this way, the antenna system is arranged to use position data as input in order to set the dependent parameters according to the current geographical position.

MODIFICATIONS

Several antenna assemblies can be arranged above each other or possibly several antenna system can be arranged above each enabling control also in elevation.

The antenna assembly may be provided with controllable inclined sides of the truncated cone-shaped bottom and/or top reflector, which can be controlled individually or together. By controlling the inclination of the sides of the truncated cone-shaped bottom and/or top reflector the narrowness of the beam can be controlled and/or elevation.

The invention claimed is:

1. An antenna assembly comprising:
    a steerable phased array antenna with omnidirectional sector and a GNSS antenna, the steerable phased array antenna with omnidirectional sector being formed by a truncated cone-shaped bottom reflector with a wide end and a smaller pointing end and a truncated cone-shaped top reflector with a wide end and a smaller pointing end arranged in a superposition facing each other with their respective pointing ends, the steerable phased array antenna with omnidirectional sector being arranged in a spacing between the said truncated cone-shaped bottom reflector and truncated cone-shaped top reflector, wherein the truncated cone-shaped bottom reflector and truncated cone-shaped top reflector are reflective for signals of the omnidirectional steerable phased array antenna, and the truncated cone-shaped top reflector is further transparent for GNSS signals for the GNSS antenna.

2. The antenna assembly according to claim 1, wherein the truncated cone-shaped bottom reflector is provided with a centrally arranged hole at its pointing end adapted for receiving and accommodating the GNSS antenna.

3. The antenna assembly according to claim 2, wherein the steerable phased array antenna with omnidirectional sector is formed by an array antenna with at least three antenna elements or by at least four antenna.

4. The antenna assembly according to claim 3, wherein the antenna elements are monopole antennas or dipole antennas.

5. The antenna assembly according to claim 3, wherein the antenna elements are arranged to protrude upwards from the truncated cone-shaped bottom reflector in a direction toward the truncated cone-shaped top reflector within a spacing therebetween but not in contact with the truncated cone-shaped top reflector.

6. The antenna assembly according to claim 5, wherein the truncated cone-shaped bottom reflector is provided with through holes at frustum thereof, adapted for receiving and accommodating the antenna elements.

7. The antenna assembly according to claim 5, wherein the antenna elements and the GNSS antenna are arranged on a common platform.

8. The antenna assembly according to claim 5, further comprising a housing formed by a main body and a top cover with an open end and a closed opposite end, wherein the top cover is detachably arranged to the main body at the open end.

9. The antenna assembly according to claim 8, wherein
the truncated cone-shaped bottom reflector is fixed to the main body and the truncated cone-shaped top reflector is fixed to the top cover interior at the closed end thereof, and
there is no physical or electrical connection between the truncated cone-shaped bottom reflector and the truncated cone-shaped top reflector.

10. The antenna assembly according to claim 1, wherein the steerable phased array antenna with omnidirectional sector is formed by an array antenna with at least three antenna elements or by at least four antenna.

11. The antenna assembly according to claim 1, further comprising a housing formed by a main body and a top cover with an open end and a closed opposite end, wherein the top cover is detachably arranged to the main body at the open end.

12. The antenna assembly according to claim 11, wherein
the truncated cone-shaped bottom reflector is fixed to the main body and the truncated cone-shaped top reflector is fixed to the top cover interior at the closed end thereof, and
there is no physical or electrical connection between the truncated cone-shaped bottom reflector and the truncated cone-shaped top reflector.

13. The antenna assembly according to claim 12, wherein the antenna elements and the GNSS antenna are arranged on a common platform.

14. The antenna assembly according to claim 1, wherein the antenna elements and the GNSS antenna are arranged on a common platform.

15. The antenna assembly according to claim 1, wherein the truncated cone-shaped bottom reflector form has a first shape and the truncated cone-shaped top reflector form has a second shape, and the first shape and second shape gain of the steerable phased array antenna with omnidirectional sector and maximizes radiation pattern of the steerable phased array antenna with omnidirectional sector in a 360 degree sector in horizontal plane of the steerable phased array antenna.

16. The antenna assembly according to claim 1, wherein lobe elevation beam width of the steerable phased array antenna with omnidirectional sector is given by length of sloping plane of the truncated cone-shaped bottom reflector and truncated cone-shaped top reflector and operating frequency.

17. An antenna system comprising the antenna assembly according to claim 15, comprising
an antenna processing module provided with software for controlling phase and amplitude of the individual antenna elements, and
oscillators controlling operational frequency of the steerable phased array antenna with omnidirectional sector.

18. The antenna system according to claim 17, further comprising a time reference module arranged to extract a time reference from a GNSS receiver module arranged to the GNSS antenna.

19. The antenna system according to claim 18, wherein the antenna processing module is arranged to use the time reference from the time reference module for calibration of the oscillators controlling the operational frequency, and time synchronization of a radio module.

* * * * *

UNITED STATES PATENT AND TRADEMARK OFFICE
CERTIFICATE OF CORRECTION

| | |
|---|---|
| PATENT NO. | : 11,867,822 B2 |
| APPLICATION NO. | : 17/414102 |
| DATED | : January 9, 2024 |
| INVENTOR(S) | : David Møller Hagen |

It is certified that error appears in the above-identified patent and that said Letters Patent is hereby corrected as shown below:

In the Claims

Column 10, Line 33:
Delete "15" and insert --1--

Signed and Sealed this
Thirteenth Day of February, 2024

Katherine Kelly Vidal
*Director of the United States Patent and Trademark Office*